(12) United States Patent
Kopsie et al.

(10) Patent No.: US 9,790,983 B2
(45) Date of Patent: Oct. 17, 2017

(54) MOVABLE JOINT ASSEMBLY

(71) Applicant: Federal-Mogul Motorparts Corporation, Southfield, MI (US)

(72) Inventors: Eric Kopsie, Bethalto, IL (US); Donald Richard Doherty, St. Peters, MO (US)

( * ) Notice: Subject to any disclaimer, the term of this patent is extended or adjusted under 35 U.S.C. 154(b) by 175 days.

(21) Appl. No.: 14/718,715

(22) Filed: May 21, 2015

(65) Prior Publication Data
US 2016/0341246 A1 Nov. 24, 2016

(51) Int. Cl.
*F16C 11/06* (2006.01)

(52) U.S. Cl.
CPC ........ *F16C 11/0671* (2013.01); *F16C 11/068* (2013.01); *F16C 11/0695* (2013.01)

(58) Field of Classification Search
CPC . F16C 11/0671; F16C 11/0666; F16C 11/068; F16C 11/0619; F16C 11/0614; F16C 11/0623; F16C 11/0642; F16J 3/042; F16J 15/52; Y10T 403/31; Y10T 403/315; Y10T 403/32196; Y10T 403/32311; Y10T 403/32631
USPC ................. 403/51, 122, 134, 135, 140, 141; 277/635, 637
See application file for complete search history.

(56) References Cited

U.S. PATENT DOCUMENTS

| | | | |
|---|---|---|---|
| 3,248,955 A | 5/1966 | Templeton | |
| 3,403,932 A | 10/1968 | Kutcher | |
| 3,901,518 A * | 8/1975 | Uchida | F16C 11/0671 277/635 |
| 4,322,175 A * | 3/1982 | Szczesny | F16B 21/20 277/635 |
| 4,650,362 A * | 3/1987 | Kubo | F16C 11/0671 277/590 |
| 4,856,795 A | 8/1989 | DeLano et al. | |
| 5,267,725 A * | 12/1993 | Wode | F16F 9/0454 267/122 |
| 5,743,669 A * | 4/1998 | Fujita | F16C 11/0633 29/898.051 |
| 6,092,954 A * | 7/2000 | Mizutani | F16C 11/0638 403/132 |

(Continued)

FOREIGN PATENT DOCUMENTS

DE 102004007331 A1 9/2005
JP 2014152855 A 8/2014

OTHER PUBLICATIONS

International Search Report, mailed Aug. 11, 2016 (PCT/US2016/033394).

*Primary Examiner* — Daniel Wiley
(74) *Attorney, Agent, or Firm* — Robert L. Stearns; Dickinson Wright, PLLC

(57) ABSTRACT

The movable joint assembly includes a housing which extends along an axis and has an outer surface and an open interior. A ball stud is partially disposed in the open interior and projects out of the housing. A flexible and elastic boot is sealed against the outer surface of the housing and against the ball stud. A metal insert is at least partially embedded within the boot adjacent an end of the boot for resisting pull out of the boot from the housing. The boot includes a lip which is at least partially spaced axially from the insert and extends radially inwardly and is in an interference fit engagement with the outer surface of the housing for establishing a fluid tight seal of the housing and for maintaining the fluid tight seal in response to injection of a lubricant into the open interior of the housing.

8 Claims, 5 Drawing Sheets

(56) References Cited

U.S. PATENT DOCUMENTS

| | | | | |
|---|---|---|---|---|
| 6,350,075 | B1* | 2/2002 | Abels | F16C 11/0666 277/635 |
| 6,561,716 | B1* | 5/2003 | Suzuki | B21K 1/762 403/131 |
| 7,244,074 | B2* | 7/2007 | Abels | F16C 11/0671 277/634 |
| 8,657,519 | B2 | 2/2014 | Watanabe et al. | |
| 9,206,837 | B2* | 12/2015 | Ishimori | F16C 11/06 |
| 2002/0101042 | A1* | 8/2002 | Jarrus | F16C 11/0671 277/635 |
| 2003/0081989 | A1* | 5/2003 | Kondoh | F16C 11/0638 403/135 |
| 2003/0156896 | A1* | 8/2003 | Suzuki | B60G 7/005 403/134 |
| 2005/0013657 | A1* | 1/2005 | Kondoh | B62D 7/166 403/122 |
| 2006/0182491 | A1* | 8/2006 | Bernhardt | F16C 11/0671 403/134 |
| 2007/0048081 | A1* | 3/2007 | Elterman | F16C 11/0671 403/122 |
| 2009/0047063 | A1* | 2/2009 | Shirai | F16C 11/0604 403/133 |
| 2010/0119297 | A1* | 5/2010 | Langendoen | F16C 11/0676 403/134 |
| 2010/0194059 | A1* | 8/2010 | Niwa | F16C 11/0671 277/630 |
| 2012/0148336 | A1* | 6/2012 | Shimazawa | F16J 3/046 403/134 |
| 2014/0079465 | A1* | 3/2014 | Idies | F16C 11/06 403/134 |
| 2014/0205366 | A1* | 7/2014 | Mevorach | B60G 7/005 403/144 |
| 2015/0001824 | A1* | 1/2015 | Kuroda | B60G 7/005 280/124.106 |
| 2015/0003896 | A1* | 1/2015 | Nishide | F16C 11/0695 403/135 |
| 2015/0030376 | A1* | 1/2015 | Shimazawa | F16C 11/0671 403/134 |

* cited by examiner

MOVABLE JOINT ASSEMBLY

BACKGROUND OF THE INVENTION

1. Field of the Invention

The present invention is related generally to movable joint assemblies and more particularly to movable joint assemblies which include a housing, a ball stud and a dust boot sealed against the housing and ball stud.

2. Related Art

Dust boots made of rubber or other similar materials are often employed to seal a movable joint assembly by preventing contaminants from entering the movable joint assembly and by capturing a lubricant, such as grease, within the movable joint assembly. Such movable joints typically include a housing and a stud which are pivotable relative to one another through a wide range of motion. The dust boot must maintain fluid tight seals with both the housing and the ball stud through the entire range of motion. Often, metal or plastic rings are placed around the circumference of the dust boot for biasing the dust boot against the housing to establish the fluid tight seals. However, the installation of the metal or plastic rings may be cumbersome and, on occasion, the dust boot may become unintentionally torn, which leads to unnecessary waste and labor to replace the torn part. The use of external rings may also require the outer surface of the housing to be machined so as to provide a surface configuration that is sufficient to produce an acceptable seal between the housing and the dust boot. The machining process further increases the cost of the movable joint.

Another option for sealing the dust boot against the housing is to capture an end of the dust boot under a crimped or spun edge of the housing. Under this option, a metal or plastic ring may additionally be placed within the dust boot to restrict unintentional pull out of the dust boot from the crimped or spun edge during full articulation of the stud and housing relative to one another. However, this option may also have certain limitations. For example, the crimping or spinning process may fail to produce an adequate seal between the dust boot and the housing. Additionally, due to the mechanical properties of common dust boot materials, the dust boot may take a so-called "compression set" after a predetermined duration of time and pressure, thereby weakening the seal between the dust boot and the housing. Overspinning or over crimping the housing onto the dust boot may not compensate for this compression set condition and may force some of the material of the dust boot to vacate the area between the mating surfaces, which presents other problems.

SUMMARY OF THE INVENTION AND ADVANTAGES

One aspect of the present invention provides for a movable joint assembly. The movable joint assembly includes a housing which extends along an axis and has an outer surface and an open interior. A ball stud is partially disposed in the open interior and projects out of the housing. A boot, which is made of a flexible and elastic material, is sealed against the outer surface of the housing and against the ball stud. A metal insert is at least partially embedded within the boot adjacent an end of the boot for resisting pull out of the boot from the housing. The boot includes a lip which is at least partially spaced axially from the insert and extends radially inwardly and is in an interference fit engagement with the outer surface of the housing for establishing a fluid tight seal of the housing and for maintaining the fluid tight seal in response to injection of a lubricant into the open interior of the housing.

The lip is advantageous because it may be added to the boot for little to no additional cost yet maintains a very strong and fluid tight seal with the outer surface of the housing, even after grease is injected into the movable joint assembly, thereby ballooning the boot outwardly. The fluid tight seal established by the lip is extremely durable and may be maintained for substantially the entire life of the movable joint assembly.

Another aspect of the present invention is a method of making a movable joint assembly. The method includes the step of providing a housing that extends along an axis and has an outer surface and an open interior. The method proceeds with the step of inserting a ball stud into the open interior of the housing. The method continues with the step of providing a dust boot which includes a boot of a flexible material and an insert at least partially embedded within the boot. The boot includes a radially inwardly extending lip which is at least partially spaced axially from the insert. The method proceeds with the step of establishing an interference fit between the lip of the boot and the outer surface of the housing. The method continues with the step of engaging the insert with the outer surface of the housing to resist pull out of the dust boot from the housing.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENT

Figure 1:
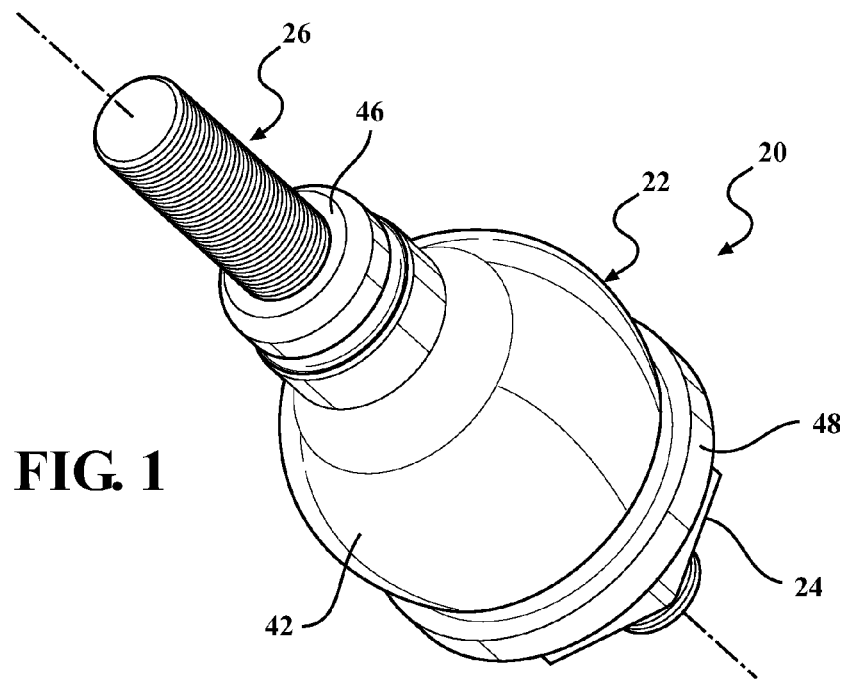
FIG. 1 is a perspective and elevation view of an exemplary embodiment of a movable joint assembly in an assembled condition.
Figure 2:
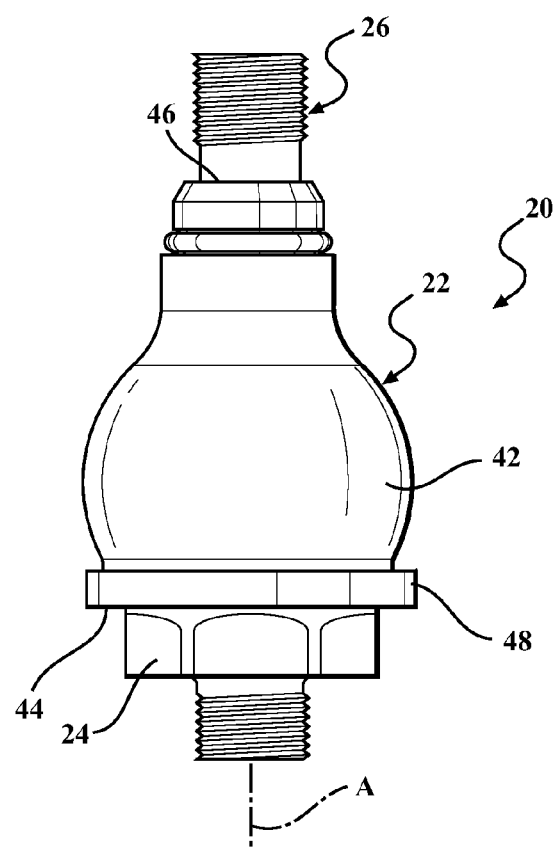
FIG. 2 is a front elevation view of the movable joint assembly of FIG. 1.

Referring to the Figures, wherein like numerals indicate corresponding parts throughout the several views, an exemplary embodiment of a movable joint assembly 20 including an improved dust boot assembly (hereinafter referred to as a "dust boot 22") is generally shown in FIGS. 1 and 2. The movable joint assembly 20 includes a housing 24 and a ball stud 26 which is received within the housing 24 and projects out of the housing 24. The housing 24 and ball stud 26 are made as separate pieces from one another and are joined to different components for allowing the components to be rotated relative to one another. Specifically, in the exemplary embodiment, each of the housing 24 and the ball stud 26 includes threads for attachment to the different components. In the exemplary embodiment, a bearing 28 (shown in FIG. 5) is interposed between the housing 24 and ball stud 26 to facilitate the rotating movement of the ball stud 26 and housing 24 relative tone another. The bearing 28 has a curved surface with a similar curvature to a ball portion 30 of the ball stud 26 to facilitate the rotatable relationship between the ball stud 26 and the housing 24. The dust boot 22 is sealed against the housing 24 and the ball stud 26 for capturing a lubricant within an interior of the movable joint assembly 20 to lubricate a sliding contact between the ball stud 26 and the housing 24. The movable joint assembly 20 may be used, for example, as a tie rod end of a steering mechanism of a vehicle. However, it should be appreciated that the movable joint assembly 20 could have a range of automotive and non-automotive uses. The housing 24 and the ball stud 26 are preferably made of metal. However, any suitable material could be employed.

Figure 8:
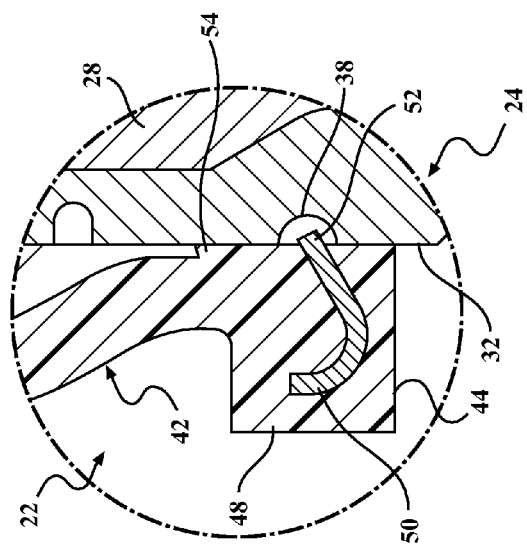
FIG. 8 is an enlarged and fragmentary view of a portion of the movable joint assembly of FIG. 7.
Figure 7:
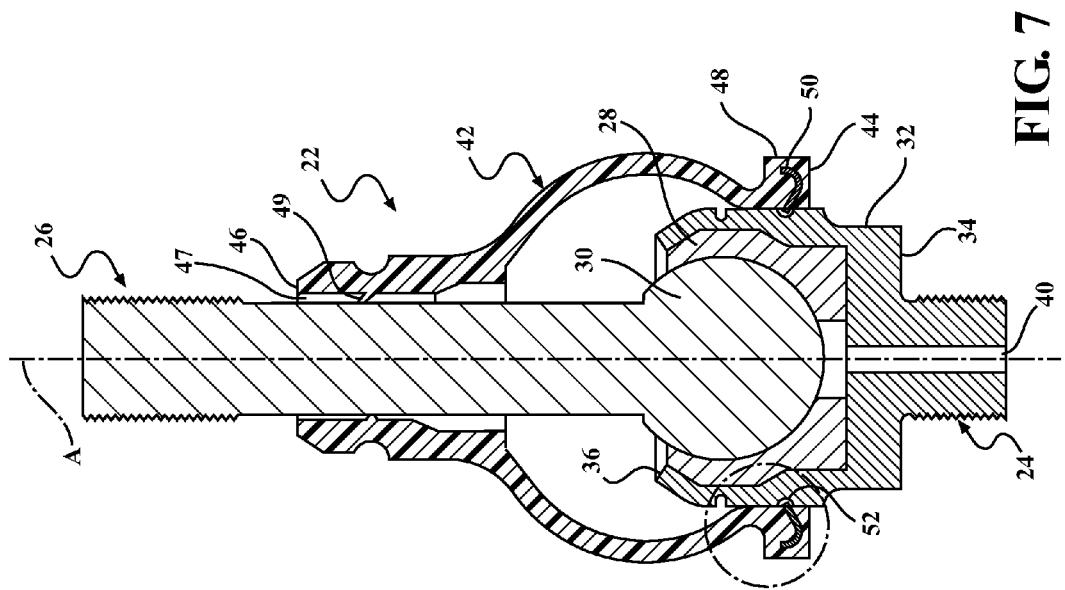
FIG. 7 is a cross-sectional view of the movable joint assembly of FIG. 1 in an assembled state and with a lubricant injected into the movable joint assembly.

Referring now to FIGS. 7 and 8, the housing 24 has an outer surface 32 and an open interior which extends axially from a closed end 34 to an open end 36. The outer surface 32 is generally cylindrical in shape and presents at least one groove 38 which is spaced axially between the closed and open ends 34, 36 and which extends circumferentially around an axis A. The closed end 34 has a lubricant passage 40 for channeling a lubricant, such as grease, into the open interior of the housing 24.

The dust boot 22 includes a boot 42 which is made as one integral piece of material and which extends axially from a first end 44 that is sealed against the outer surface 32 of the housing 24 and a second end 46 which is sealed against the ball stud 26. Specifically, the first end 44 of the boot 42 is sealed against the outer surface 32 of the housing 24 axially between the groove 38 and the closed end 34 of the housing 24. The boot 42 additionally includes a grease relief passage 47 which extends axially to the second end 46 and with a gas relief valve 49 which extends radially inwardly to contact the ball stud 26. The boot 42 is made of any suitably flexible and elastic material for flexing to maintain the fluid-tight seals with the housing 24 and the ball stud 26 during movement of the ball stud 26 relative to the housing 24. The boot 42 may be sealed against the ball stud 26 through any suitable means.

Figure 3:
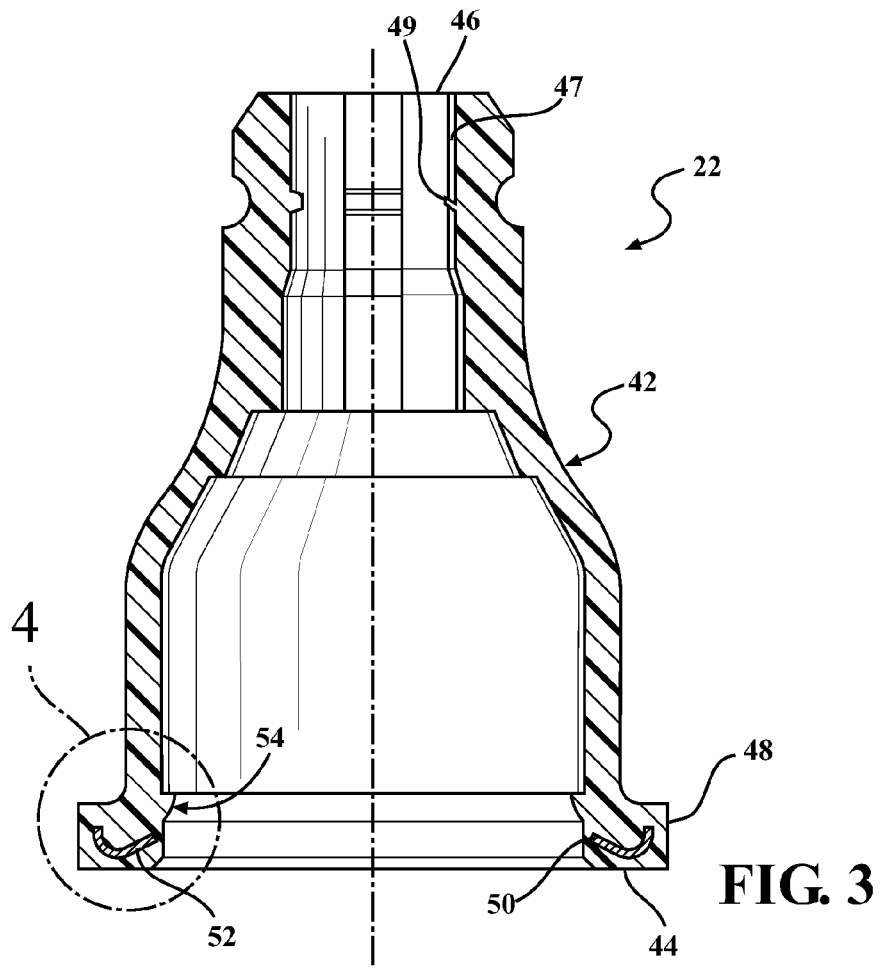
FIG. 3 is a cross-sectional view of a dust boot of the movable joint assembly of FIG. 1.
Figure 4:
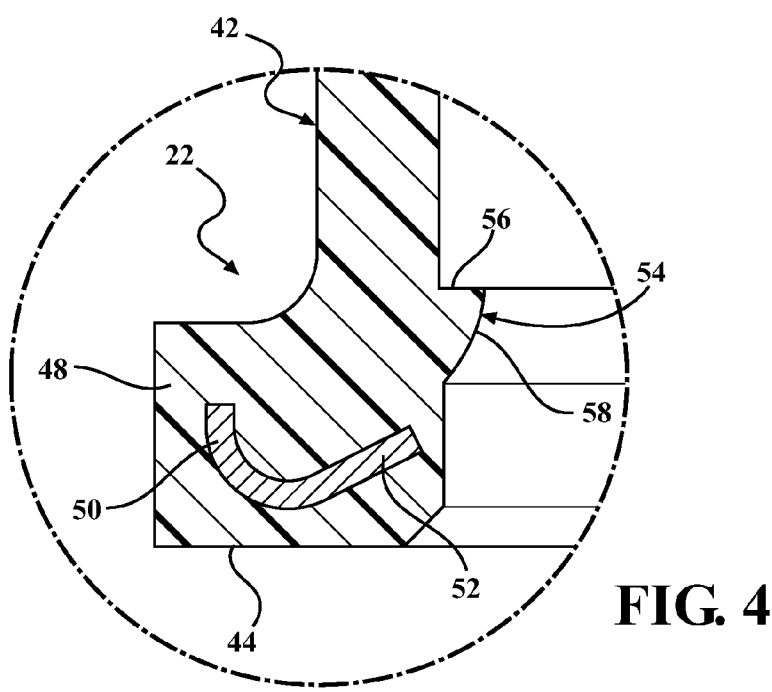
FIG. 4 is an enlarged and fragmentary view of a portion of the dust boot of FIG. 3.
Figure 9:
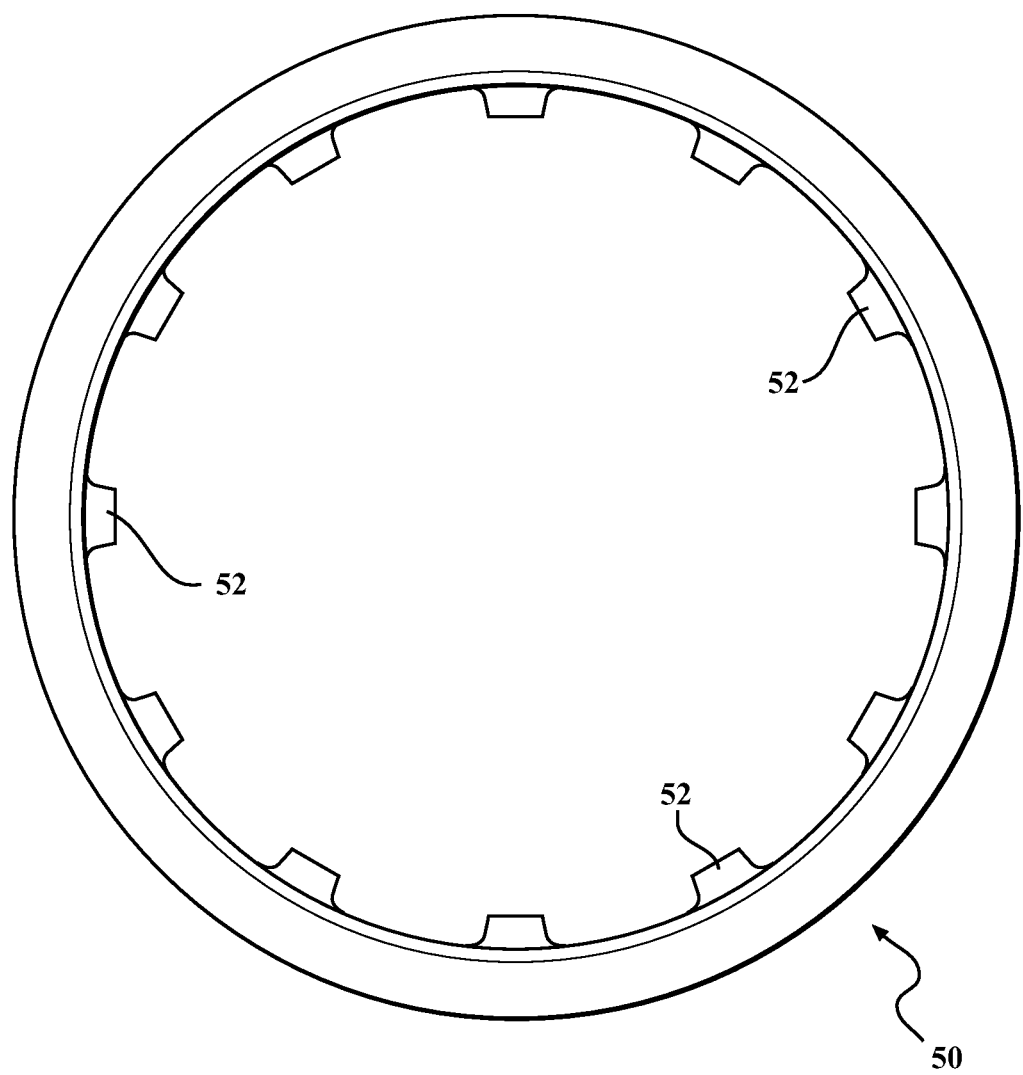
FIG. 9 is a top elevation view of a metal insert of the movable joint of FIG. 1.

FIG. 3 shows the dust boot 22 in a pre-installation condition, i.e., before being engaged with the housing 24. As shown, adjacent the first end 44, the boot 42 includes a flange which extends radially outwardly to present a flange portion 48, which has an increased wall thickness relative to an adjacent area of the boot 42. The dust boot 22 further includes an insert 50, which is made of metal and is encapsulated or embedded within the flange portion 48 of the boot 42. As shown in FIG. 9, the metal insert 50 is annular in shape and includes a plurality of radially inwardly extending teeth 52 which are spaced generally uniformly from one another in a circumferential direction. Referring now to FIG. 4, each tooth 52 extends at an angle axially away from the first end 44 of the boot 42.

Referring still to FIG. 4, the boot 42 further includes a radially inwardly extending lip 54 that is spaced axially between the metal insert 50 and the second end 46 (shown in FIG. 3). The lip 54 has a ramped surface 58 which faces axially towards the first end 44 of the boot 42 and a perpendicular surface 56 which faces axially towards the second end 46. The ramped surface 58 facilitates easy installation of the boot 42 on the housing 24.

Figure 6:
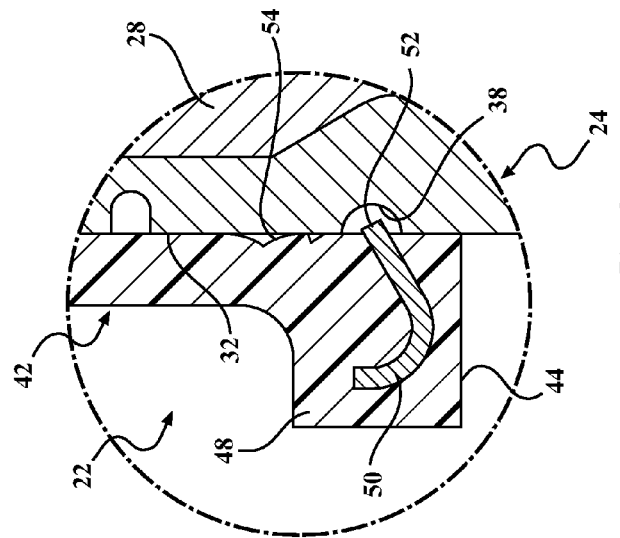
FIG. 6 is an enlarged and fragmentary view of a portion of the movable joint assembly of FIG. 5.
Figure 5:
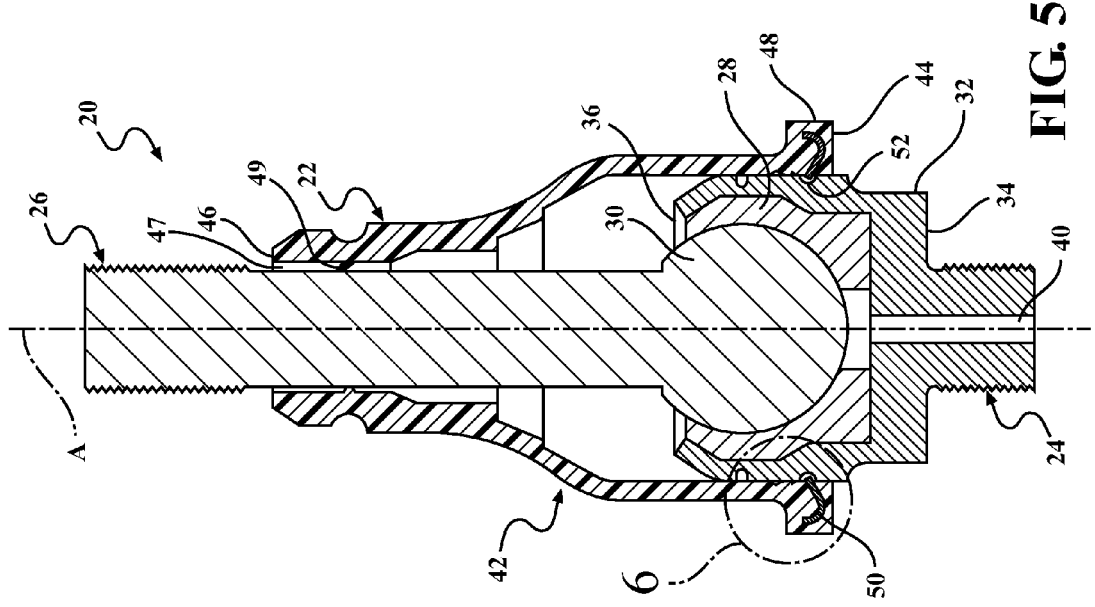
FIG. 5 is a cross-sectional view of the movable joint assembly of FIG. 1 in an assembled state but before a lubricant is injected into the movable joint assembly.

Referring now to FIGS. 5 and 6, the dust boot 22 is engaged with the housing 24 by urging the first end 44 of the boot 42 onto the open end 36 of the housing 24. The boot 42 is then urged axially towards the closed end 34 of the housing 24 until the teeth 52 of the metal insert 50 protrude inwardly from the boot 42 and are snappingly received within the groove 38 on the outer surface 32 of the housing 24. Because the teeth 52 point axially towards the second end 46 of the boot 42, once received within the groove 38, the teeth 52 resist pull out of the dust boot 22 from the housing 24.

As shown in FIG. 6, when the dust boot 22 is engaged with the housing 24, an interference fit is established between the lip 54 and the outer surface 32 of the housing 24. That is, the lip 54 is compressed by the tight fit between the boot 42 and the outer surface 32 of the housing 24. This provides a very strong, fluid tight seal between the dust boot 22 and the housing 24.

Referring now to FIG. 7, once the ball stud 26 and dust boot 22 are installed in the housing 24, the lubricant is injected through the lubricant passage 40 and into the movable joint assembly 20. The lubricant is injected at such a pressure so as to balloon the boot 42 outwardly to ensure proper and long-lasting lubrication of the movable joint assembly 20. The interference fit between the boot 42 and the outer surface 32 of the housing 24 protects maintains the lubricant tight seal between the boot 42 and the outer surface 32 of the housing 24 to ensure lubrication of the contact surface between the ball stud 26 and the bearing 28 for the life of the movable joint assembly 20. Additionally, the grease relief valve 49 in the grease passage 47 is specifically configured to channel grease out of the movable joint assembly 20 if the grease reaches a certain predetermined pressure while the lip 54 maintains the fluid tight seal with the housing 24. Additionally, the interference fit between the lip 54 and the outer surface 32 of the housing 24 limits or even prevents any movement of the flange portion 48 of the boot 42 when the lubricant is injected into the interior of the housing 24. That is, while the remainder of the boot 42 balloons outwardly as shown in FIG. 7, the flange portion 48 remains stationary.

Another aspect of the present invention provides for a method of making a movable joint assembly 20. The method includes the step of providing a housing 24 which has an outer surface 32 with a groove 38 formed therein and also has an open interior. The method continues with the step of inserting a bearing 28 and a ball portion 30 of a ball stud 26 into the open interior of the housing 24. The method continues with the step of providing a dust boot 22 which includes a boot 42 and an insert 50 that is embedded within the boot 42. The boot 42 extends axially from a first end 44 to a second end 46, and adjacent the first end 44, the boot 42 has a flange portion 48 which has an increased wall thickness relative to an adjacent portion of the boot 42. The insert 50 is of metal and is embedded within the flange portion 48 of the boot 42. The boot 42 further includes a lip 54 which extends radially inwardly and is located axially between the insert 50 and the second end 46 of the boot 42.

The method proceeds with the step of establishing an interference fit and fluid tight seal between the lip 54 of the boot 42 and the outer surface 32 of the housing 24. The method proceeds with the step of piercing the boot 42 with the metal insert 50 and receiving a portion of the metal insert 50 within the groove 38 of the outer surface 32 of the housing 24 to resist pull-out of the dust boot 22 from the housing 24. The method continues with the steps of sealing the boot 42 against the ball stud 26 and injecting a lubricant into the open interior of the housing 24. The interference fit between the lip 54 of the boot 42 and the outer surface 32 of the housing 24 restricts or prevents the escape of the lubricant out of the interior of the movable joint assembly 20.

Obviously, many modifications and variations of the present invention are possible in light of the above teachings and may be practiced otherwise than as specifically described while within the scope of the appended claims.

What is claimed is:

1. A moveable joint assembly, comprising:
a housing which extends along an axis and has an outer surface and an open interior;
a ball stud partially disposed in said open interior of said housing and projecting out of said housing;
a boot of a flexible and elastic material and being sealed against said outer surface of said housing and against said ball stud;
an insert made of metal and being at least partially embedded within said boot adjacent an end of said boot for resisting pull out of said boot from said housing;
said boot including a lip which is at least partially spaced axially from said insert and which extends radially inwardly and is in an interference fit engagement with said outer surface of said housing for establishing a fluid tight seal with said outer surface of said housing and for maintaining said fluid tight seal in response to injection of a lubricant into said open interior of said housing; and
said lip having a first surface which extends perpendicularly to said axis when in a pre-installed condition and such that, when said boot is installed on said housing and said housing is filled with lubricant, said first surface is angled relative to said axis to improve said fluid tight seal between said boot and said outer surface of said housing.

2. The movable joint assembly as set forth in claim 1 wherein said outer surface of said housing includes a groove formed therein.

3. The movable joint assembly as set forth in claim 2 wherein said insert includes teeth which protrude into said groove and is directly engaged against said outer surface of said housing to resist pull out of said dust boot from said housing.

4. The movable joint assembly as set forth in claim 3 wherein each of said teeth of said insert extends both radially and axially to further resist pull out of said dust boot from said housing.

5. The movable joint assembly as set forth in claim 3 wherein said boot includes a first end which is sealed against said ball stud and a second end which is sealed against said outer surface of said housing.

6. The movable joint assembly as set forth in claim 5 wherein said insert is partially embedded within said boot adjacent said first end.

7. The movable joint assembly as set forth in claim 6 wherein said lip is located axially between said insert and said second end of said boot.

8. The movable joint assembly as set forth in claim 1 wherein said housing has a closed end and an open end and wherein said closed end presents a lubricant passage for channeling a lubricant into said open interior of said housing.

* * * * *